United States Patent [19]
Koffski
[11] Patent Number: 4,502,565
[45] Date of Patent: Mar. 5, 1985

[54] WORK SUPPORT

[76] Inventor: James R. Koffski, R.R. #4, Duncan, British Columbia, Canada

[21] Appl. No.: 543,948
[22] Filed: Oct. 20, 1983
[51] Int. Cl.³ .......... F16M 11/00; E04G 1/32
[52] U.S. Cl. .......... 182/184; 182/185; 182/225
[58] Field of Search .......... 182/181-186, 182/224-226, 178, 179

[56] References Cited

U.S. PATENT DOCUMENTS

| | | | |
|---|---|---|---|
| 381,510 | 4/1888 | Rush | 182/186 |
| 1,682,671 | 8/1928 | Gooding | 182/186 |
| 1,718,891 | 6/1929 | Bratt | 182/201 |
| 2,891,819 | 6/1959 | Jackson | 182/186 |
| 2,899,011 | 8/1959 | Babits | 182/120 |
| 4,134,473 | 1/1979 | Prior | 182/186 |
| 4,228,871 | 10/1980 | Koffski | 182/184 |
| 4,296,835 | 10/1981 | Koffski | 182/185 |
| 4,298,095 | 11/1981 | Jackson | 182/185 |
| 4,308,934 | 1/1982 | Jackson | 182/184 |

*Primary Examiner*—Reinaldo P. Machado
*Attorney, Agent, or Firm*—Stevens, Davis, Miller & Mosher

[57] ABSTRACT

A work support. The support has a cross member of variable length to receive and support planks of variable width. Leg supports extend downwardly and outwardly from each end of the cross member. There are stops attached to the cross member, adjacent each end, to locate each side of a plank carried by the cross member. The plank can be located on the cross member and legs are supported in the leg supports.

10 Claims, 8 Drawing Figures

WORK SUPPORT

FIELD OF THE INVENTION

This invention relates to a work support.

DESCRIPTION OF THE PRIOR ART

Work supports are well-known and becoming increasingly popular. For example U.S. Pat. No. 4,228,871 issued to Koffski Oct. 21, 1980, describes a bracket useful to form a free standing structure that can, particularly for domestic use, replace scaffolding. Scaffolding is, of course, relatively complex to put up and is not normally used by an individual working on his own house or, indeed, professional workers working on houses. In general it is used for industrial application on a relatively large scale and ladders are used in working on houses.

Ladders have a number of disadvantages. In particular they require a level support surface if the person on the ladder is not to be in danger.

The bracket described and claimed in the above patent has proved useful but is improved by the present invention which, in one aspect, has a cross member of variable length, unlike the fixed length crosspiece of the patent and, in another aspect, has an improved method of locating the legs useful with the work support.

SUMMARY OF THE INVENTION

Accordingly, the present invention provides a work support comprising a cross member of variable length to receive and support planks of variable width; leg support means extending downwardly and outwardly from each end of the cross member; stops attached to the cross member adjacent each end to locate each side of a plank carried by the cross member; means to locate the plank on the cross member; and means to locate a leg in each leg support means.

BRIEF DESCRIPTION OF THE DRAWINGS

Aspects of the invention are illustrated, merely by way of example, in the accompanying drawings in which.

DESCRIPTION OF THE PREFERRED EMBODIMENT

Figure 1:
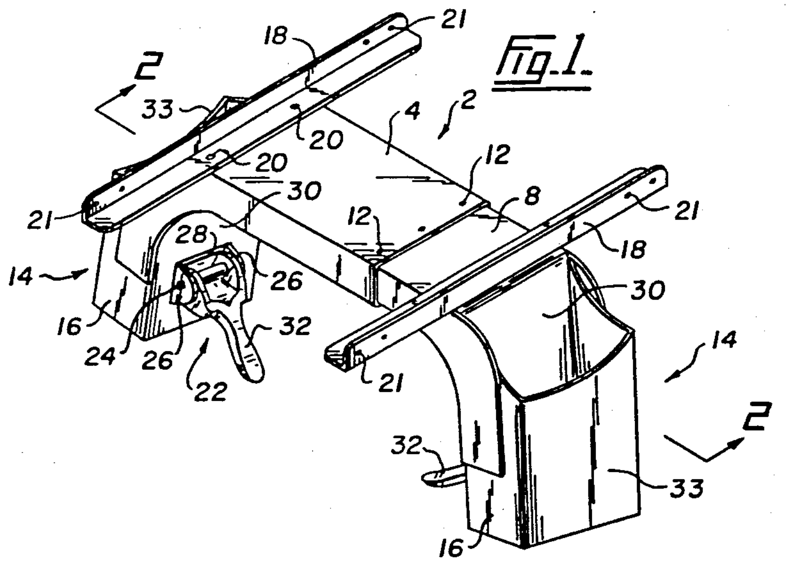
FIG. 1 is a perspective view of a first embodiment of the present invention.
Figure 2:
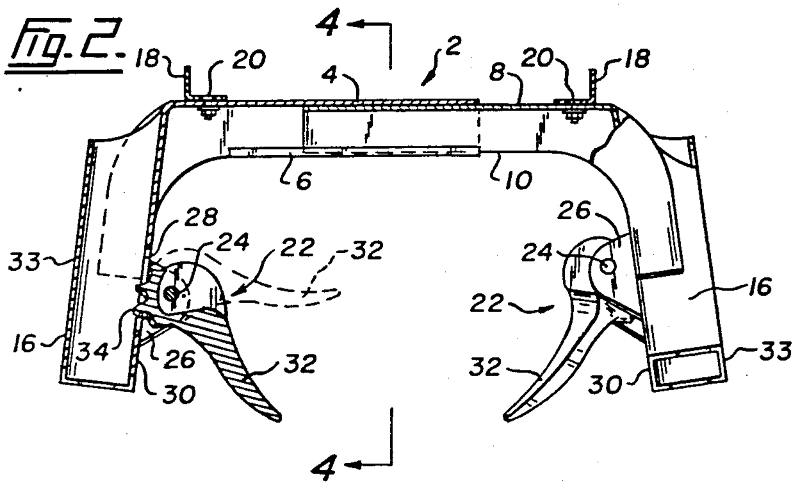
FIG. 2 is a view on the line 2—2 in FIG. 1.
Figure 3:
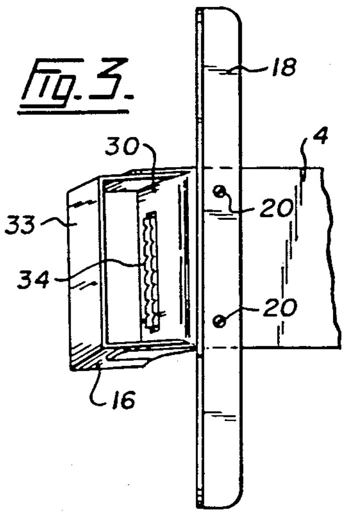
FIG. 3 is a detail, in plan, of the embodiment of FIG. 1.
Figure 4:
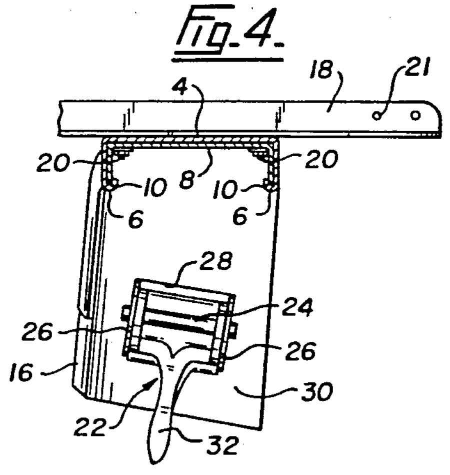
FIG. 4 is a view on the line 4—4 in FIG. 2.
Figure 5:
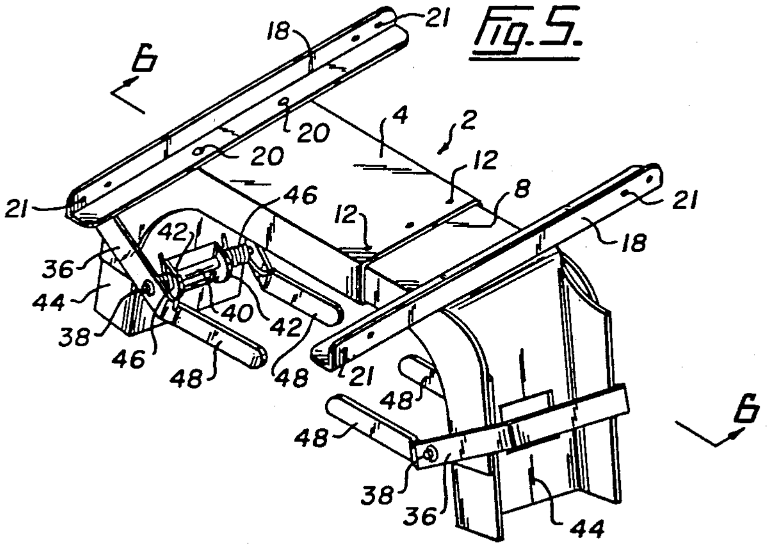
FIG. 5 is a perspective view of a second embodiment of the present invention.
Figure 6:
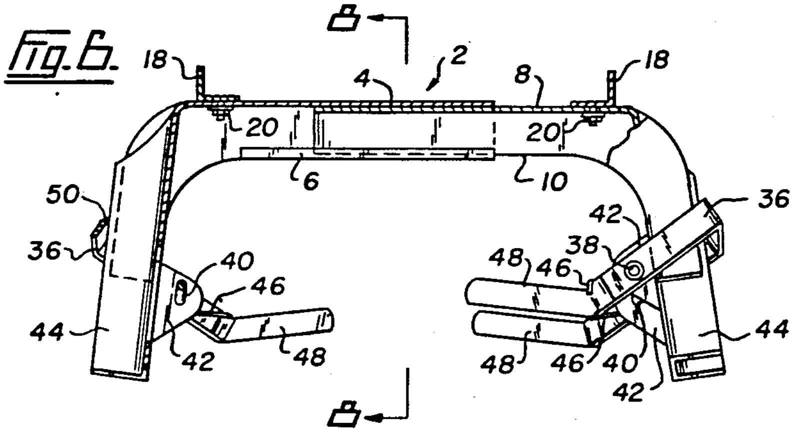
FIG. 6 is a view on the line 6—6 in FIG. 5.
Figure 7:
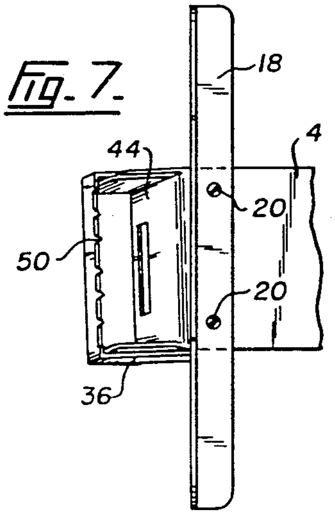
FIG. 7 is a detail view, in plan, of FIG. 5.
Figure 8:
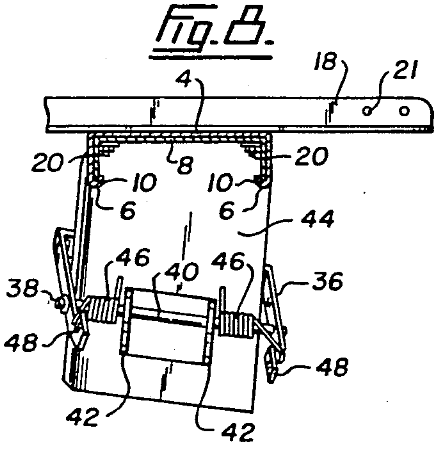
FIG. 8 is a section on the line 8—8 in FIG. 6.

The drawings illustrate a work support comprising a cross member 2 of variable length to receive and support a plank, not shown, whose width may vary. As shown particularly in FIG. 2 and in FIG. 6 cross member 2 of variable length comprises two members, an outer member 4 provided with an inwardly turned channel 6—see FIG. 4—and an inner member 8 whose lower edge 10 is engaged in the channel 6. As shown in FIG. 1 the telescoping of the two members 4 and 8 may be prevented by the provision of clamping means such as bolts 12 extending through the two members 4 and 8.

FIGS. 1 to 4 show leg support means 14 extending downwardly and outwardly from each end of the cross member 2. As will be appreciated particularly from FIGS. 1 and 2 each leg support means is fastened to or may be integral with a telescoping member 4 or 8 that makes up the cross member 2. Each leg support means 14 comprises a housing 16 adapted to surround a leg (not shown) of generally rectangular cross section. In this regard it will be noted that typically the leg will be a piece of lumber, for example 2×4, arranged to be a close fit within a housing 16.

The work support has stops 18 attached to each cross member at 20. In the embodiments illustrated the stops comprise angle bars bolted to the cross member 2. A more permanent attachment can be used. For example the angle bars may be welded to the cross member 2.

The stops 18 are adapted to contact and locate each side of a plank carried by the cross member 2. There are means to locate a plank on the cross member 2 and, in the illustrated embodiment, the means comprise simple screw holes 21 formed in the angle bars. When a plank is screwed into position, using wood screws inserted through holes 21, it will be understood that telescoping of the cross member 2 is not possible so that bolts 12 can be replaced by the simple use of wood screws extending through the holes 21.

There are means to locate a leg in each leg support means. When, as in FIGS. 1 to 4, the leg support means comprises a housing 16 in the location of the leg is by the provision of a cam member 22 pivotally attached to the housing 16 by a shaft 24 extending through the cam member 22 and through lugs 26 extending from the housing 16. There is an opening 28 formed in each inner surface 30 of each housing 16 and the cam member 22 projects through that opening 28 into the housing 16. A lever 32 permits hand operation of the cam member 22 between a first position—shown in broken lines in FIG. 4—where a leg may be inserted into the housing 16 without obstruction, to a second position—shown in solid cross section in FIG. 2—where a leg in the housing 16 is forced outwardly by the cam member 22, again an outer surface 33 of the housing 16 to locate the leg.

The embodiment of FIGS. 1 to 4 is used as follows. First a plank of the required width to act as a support for a worker and to be carried by the cross member 2 is selected and two work supports, each as shown in FIG. 1, are attached at each end of the plank. Pieces of lumber of the required cross section and length are then inserted into the four housings 16 at each corner of the plank. To do this the levers 32 are moved to the position shown in FIG. 2 in broken lines and the legs inserted until the plank is supported in the required position. It will be appreciated that the legs are positioned entirely independently of each other so that the fact that the ground is not level is not a serious concern. When the plank is in the required position the levers 32 are rotated to turn the cam members 22 to force the legs outwardly to locate them in the housings 16. As shown particularly in FIGS. 2 and 3 it is desirable that the cams be provided with teeth 34 on their leg contacting inner surfaces to facilitate the grip of the cam member 22 on the legs.

The embodiment of FIGS. 5 to 8 differs only by the provision of a bracket 36 extending from a pivotal mounting 38 on shaft 40 pivotally engaged in lugs 42 around the front of open channel members 44, opening outwardly from the cross member. These open channel members 44 are dimensioned to receive legs (not shown) as in the FIGS. 1 to 4 embodiment. The brackets 36 are urged to their upward position, in which they grip a leg, by springs 46 provided at each of lugs formed in the inner surfaces of the channels. Two springs 46 are shown but one is usually sufficient. Hand levers 48 extend inwardly to facilitate operation of the brackets 36. As particularly shown in FIGS. 6 and 7 the brackets may be provided with teeth 50 to facilitate gripping of the legs in position.

The embodiment of FIGS. 5 to 8 is used as follows. First a plank is located on the cross member as described for FIGS. 1 to 4. Levers 48 are pushed upwardly to move the brackets 36 downwardly from the position shown in, for example, FIG. 6. This permits a leg to be inserted in the open channel members 44, to be surrounded by a channel member 44 and a bracket 36. When the leg is in the required position the levers 48 are released and the brackets 36 grip the leg. The leg is of a depth slightly greater than the depth of the channel member 44 so that the bracket 36 can be certain to contact and locate a leg.

The invention thus provides a support that is robust and easy to use. The supports do not require level terrain nor, of course, is it necessary that they be carried with a plank or with legs. If they are to be used professionally the sort of lumber that would be used to form the plank carried by the cross member and the legs would be easily available on any building site. An advantage over prior art supports is the variable length of the cross member 2. This ensures that the support takes up only the space it needs to support a plate rather than the fixed space of cross members of fixed length. The support of the invention can also hold planks of considerable width by separating the telescoping parts of the cross member.

The telescoping parts can be separated to facilitate storage.

It has also been noted that the support of the invention has less tendency to permit dirt to enter the leg supports comprised with prior art structures. This feature helps in the ease of use of the support.

The embodiments of the invention in which an exclusive property or privilege is claimed are defined as follows:

1. A work support comprising:

a cross member of variable length for receiving and supporting at least one supported member, the cross member being in two separable sections, one section being adapted to telescope within the other;

means for enabling said two sections to be held in a fixed spaced apart relationship whether or not telescoped together;

leg support means extending downwardly and outwardly from each end of the cross member;

respective stops fixedly attached to each of said sections adjacent an end thereof; and means to hold a leg in each leg support means.

2. A work support as claimed in claim 1, wherein said enabling means comprises holes provided in each section of said cross piece, at least some of said holes enabling engagement of each section with a spacing member defining said spaced apart relationship.

3. A work support as claimed in claim 2, wherein said holes are provided at least in the stops of each of said sections for engaging with a support member acting as said spacing member.

4. A work support as claimed in claim 3, wherein each of said sections includes a channel portion, the channel portion of one of said sections being slidable within the channel portion of the other of said sections and wherein said holes are also provided in said channel portions.

5. A work support as claimed in claim 1 in which the leg support means are channels opening outwardly from said cross member and are adapted to receive a leg of generally rectangular cross section.

6. A work support as claimed in claim 5 in which the means to locate a leg in each leg support means comprises a bracket pivotally attached to each channel on a wall of the channel remote from the open, outwardly disposed side and extending round and across the open face of the channel to contact and retain a leg held in the channel;

a lever extending inwardly from the bracket to permit hand movement of the bracket; and resilient means urging the bracket to a position in which it locates a leg.

7. A work support as claimed in claim 1 in which the leg support means comprises a housing adapted to surround a leg of generally rectangular cross section.

8. A work support as claimed in claim 7 including a cam member pivotally attached to an inner face of the housing;

an opening in said inner face whereby the cam can project into the housing;

a lever to permit rotation of the cam between a first position where a leg may be inserted into the housing without obstruction to a second position where a leg in the housing is forced outwardly by the cam, against an outer surface of the housing, to locate the leg.

9. A work support as claimed in claim 1 in which the stops attached to each cross member are angle bars located with one limb of the angle extending upwardly to abut a side of a supported member plank.

10. A work support as claimed in claim 9 in which said enabling means comprises holes formed in the angle bars to permit fasteners to be inserted through and into a supported member carried by the cross member.

* * * * *